May 19, 1970    J. N. SNYDER    3,513,284
HIGH FREQUENCY WELDING APPARATUS
Filed July 19, 1967    2 Sheets-Sheet 1

INVENTOR
James N. Snyder

May 19, 1970  J. N. SNYDER  3,513,284
HIGH FREQUENCY WELDING APPARATUS
Filed July 19, 1967  2 Sheets-Sheet 2
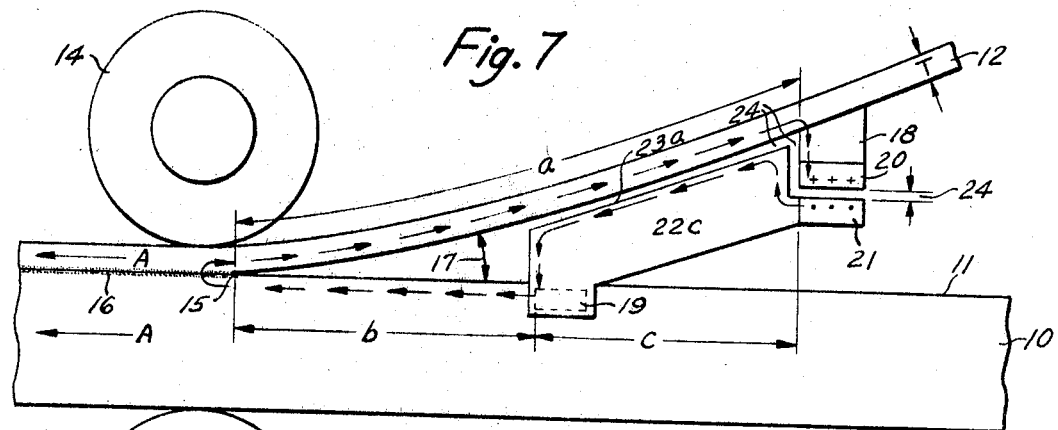
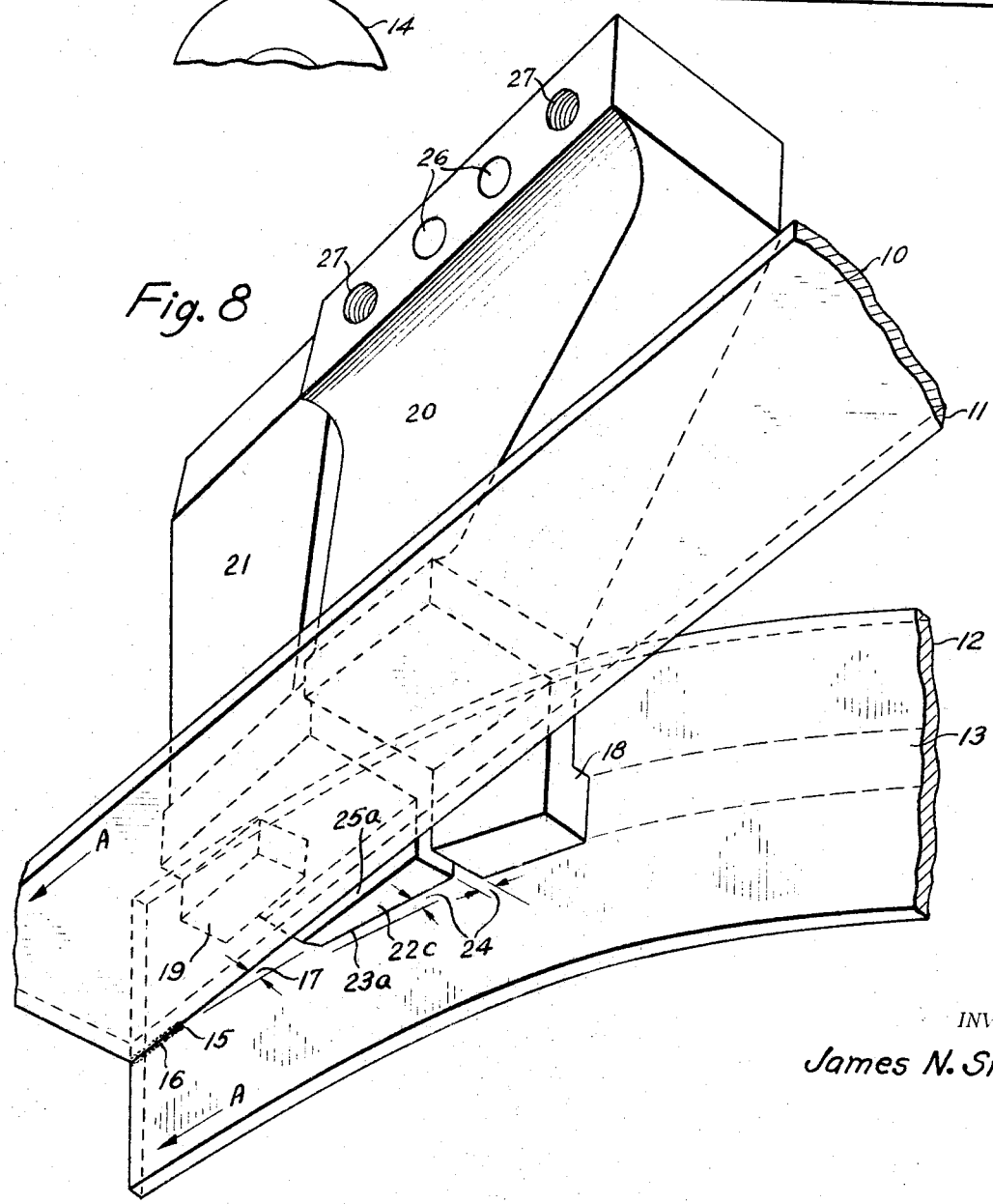
INVENTOR
James N. Snyder United States Patent Office 3,513,284
Patented May 19, 1970

3,513,284
HIGH FREQUENCY WELDING APPARATUS
James N. Snyder, Bethlehem, Pa., assignor to Bethlehem Steel Corporation, a corporation of Delaware
Filed July 19, 1967, Ser. No. 654,581
Int. Cl. B23k 11/02
U.S. Cl. 219—102                                5 Claims

ABSTRACT OF THE DISCLOSURE

High frequency resistance heating apparatus, for welding the edge of a web member to the face of a flange member, which includes contacts, that are connected to a source of high-frequency current, and an electrically conductive element. The members are joined at a weld point ahead of which they form a V-shaped gap. The contacts are spaced from one another and from the weld point, and each contact slidably engages and conducts heat to one of the members. The electrically conductive element is secured, adjacent one end, to one of the spaced contacts and extends in the V-shaped gap formed by the members toward the other contact so as to cause current to flow along the desired weld path of the flange member.

BACKGROUND OF THE INVENTION

This invention relates to apparatus for welding by the use of high frequency resistance heating and more particularly for welding the edge of one elongated metal section to the surface of another.

High frequency alternating current has three characteristics which make it eminently suited to continuous welding processes. One characteristic is termed "skin effect" or the tendency of the current density in a conductor to be greatest at the surface. Another characteristic is termed "proximity effect" or the tendency of high frequency current to follow the low inductance path rather than the low resistance path. The third characteristic is "induction heating" or heating which takes place when an electrically conducting object, not necessarily magnetic steel, is placed in a varying magnetic field. High frequency welding has achieved its greatest success with the fabrication of members, such as tubular products, which have a weld of symmetrical cross section. In such members the same amount of heat is introduced into both abutting edges of the metal section by means of contacts spaced equidistant from the weld point. However, where the weld is not of symmetrical cross section, as with the weld of a T or web-flange member, high frequency welding creates certain undesirable effects.

The use of high frequency resistance heating has heretofore been proposed, for example as disclosed in U.S. Pat. No. 2,821,619 to W. C. Rudd, for welding together the edge of one metal member to the surface of another metal member. Said patent discloses such a welding method wherein two metal members, a web member and a flange member, are advanced in a manner to bring the edge of the web member into contact with and weld it to the surface of the flange member. The members form a V-shaped gap immediately in advance of the weld point. The members are brought up to welding tempearture by means of contacts, each of which slidably engages one of the members adjacent the area to be heated. One contact is positioned adjacent the edge of the web member, in advance of the weld point, and the other contact is positioned adjacent the weld path of the flange, also in advance of the weld point. Each contact is secured to a conductor which is connected to a source of high-frequency current. To bring the weld areas of both members to the desired welding temperature and to achieve a heat balance in the members, the contacts are offset with respect to one another. The contact for the flange member, which has a semi infinite area to be heated, is placed a greater distance from the weld point than the contactor for the web member, which is heated only along its edge, so that the current passes for a longer period into the flange than into the web. However, even with offset contacts proper heat balance is difficult to achieve when welding a web-flange member. It has been noted that in some cases unsymmetrical heating occurs; for example, at times, in addition to the flange being heated along the weld path, the top corner or edge of the flange is heated to incandescence. When welding relatively thin flange stock, ⅛″ or less, the entire top half of the flange frequently develops a blue "temper color." Under the circumstances, it is obvious that electrical energy is wasted by the dissipation of heat throughout the flange rather than the concentration of heat along the weld path, as desired. In addition, unsymmetrical heating and cooling of the flange produces residual stresses in the finished member tending to distort the section in a helical twisted pattern which complicates the straightening operation.

The undesirable heating pattern in the flange can be explained by the above mentioned characteristics of high frequency alternating current. "Skin effect" causes the web current to concentrate on the edge of the web while the flange current, with no "edge" to define its path, spreads aimlessly over the flange surface. "Induction heating" occurs due to the two current carrying conductors leading to the contacts acting as a one-turn induction heating coil. The magnetic flux field is strongest between the current carrying conductors. The two current carrying conductors leading to the contacts create by "proximity effect" a lowest inductance path in the flange which does not coincide with the desired current path. In FIG. 1 the "path of least inductance" in the flange is shown by the shaded areas. Areas 1 are created by proximity effect of the current carrying conductors. Area 2 is created by the limiting condition of the flange edge, i.e., "skin effect" causes the current to "crowd" the edge, heating it to incandescence. Area 3, which indicates a desirable path, is caused by the proximity effect of the current passing along the edge of the web.

SUMMARY OF THE INVENTION

It is an object of this invention to provide high frequency resistance heating apparatus which will efficiently concentrate heat along the weld path of an elongated flange member to which is welded the edge of an elongated web member.

Another object of this invention is to provide improved high frequency resistance heating apparatus which will permit the welding of web-flange members more rapidly than presently known apparatus of this type.

A further object of this invention is to provide high frequency resistance heating apparatus which will permit the welding of substantially straight web-flange sections, i.e., without the usual unsymmetrical heating of the flange and the resulting twist distortion of the section.

The objects of this invention are achieved by welding a web member on edge to the surface of a flange member by means of improved high frequency resistance heating apparatus which includes spaced contacts and an electrically conductive element that is secured at one end to one of the contacts and extends, in advance of the weld point and adjacent the desired weld path in the V-shaped gap between the web and flange members, toward the other contact.

BRIEF DESCRIPTION OF THE DRAWINGS

FIGS. 6 and 7 are schematic plan views similar to that of FIG. 3 but showing other schematic embodiments of the invention.

FIG. 8 is a perspective view illustrating an actual embodiment of the invention.

PREFERRED EMBODIMENTS OF THE INVENTION

Figure 1:
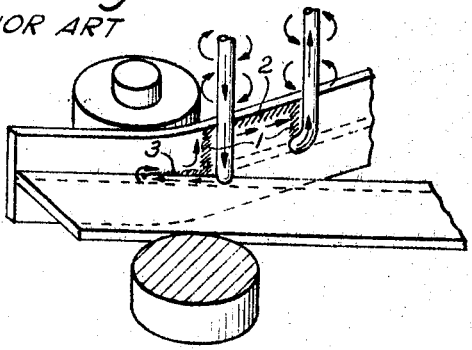
FIG. 1 is a schematic-diagrammatic perspective view of the prior art high-frequency welding apparatus which creates undesirable heating in shaded areas 1 and 2 in a flange member to be welded to the edge of a web member to form a web-flange section.

Referring to the drawings there is shown elongated metal element or web member 10 which is to be welded along edge 11 to elongated metal plate or flange member 12 along weld path 13, as indicated by dotted lines. The members are uniformly advanced in the direction of arrows A—A between pressure rollers 14—14 which force the members together at point 15 where welding occurs, so that subsequently the members are welded together, as indicated at 16. Web member 10 and flange member 12 are advanced toward the weld point in a manner to form a V-shaped gap, as indicated at 17, between edge 11 of web member 10 and weld path 13 of flange member 12. Contact 18 is applied to flange member 12 along weld path 13 a distance $a$ in advance of the weld point. Contact 19 is applied to web member 10 adjacent edge 11 a distance $b$ in advance of the weld point. The contacts are offset so that distance $a$ between the flange member contact 18 and the weld point is greater than the distance $b$ between web member contact 19 and the weld point. Each of the contacts is connected, by means hereinafter disclosed, to a source, not shown, of high frequency current which is conducted to portions of the members to bring them up to welding temperature ahead of weld point 15, as is well known to those skilled in the art.

Figure 2:
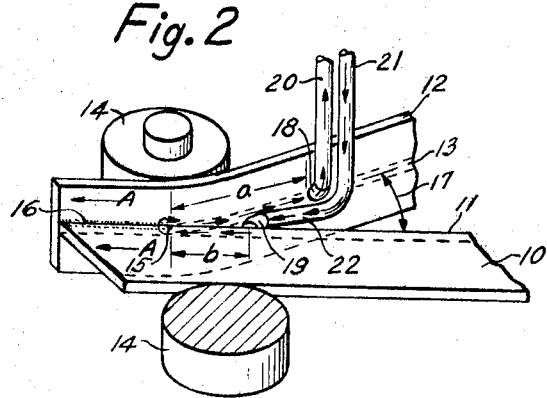
FIG. 2 is a schematic-diagrammatic perspective view of the high frequency welding apparatus of this invention which, in the fabrication of a web-flange section, heats the flange member along the desired weld path by having the current conducted along this path as shown by the arrows.

Referring in further detail to FIG. 2, flange contact 18 is affixed, in any suitable manner to contact holder 20, which is connected to a source of high-frequency current. Web contact 19 is joined to contact holder 21 by means of gap conductor or electrically conductive member 22, which is affixed adjacent one end to contact 19 and adjacent the other end to contact holder 21. Contact holder 21 is connected to the same source of high-frequency current as contact holder 20. Gap conductor 22 extends horizontally through gap 17 from a position adjacent web contact 19 to a position at the lower end of contact holder 21, adjacent flange contact 18. The positioning of gap conductor 22 in the gap 17 between edge 11 of web member 10 and weld area 13 of flange member 12 forms a low inductance path such that the electrical current flowing through the contact holders, the gap conductor, the contacts and the members to be welded follows a path, shown by arrows, from contact 19 adjacent web edge 11 to weld point 15, then along weld path 13 of flange 12 to its contact 18. Gap conductor 22 "encourages" the current to flow along the desired weld path 13 of flange 12 so that it is heated to approximately the same degree as web edge 11. Since flange current is concentrated along the weld path, rather than being dissipated throughout a wide area of the flange a good quality weld is made at higher speeds than is achieved without the gap conductor, and unsymmetrical heating, with its resulting helical "twist" distortion of the web-flange section does not occur.

Figure 4:
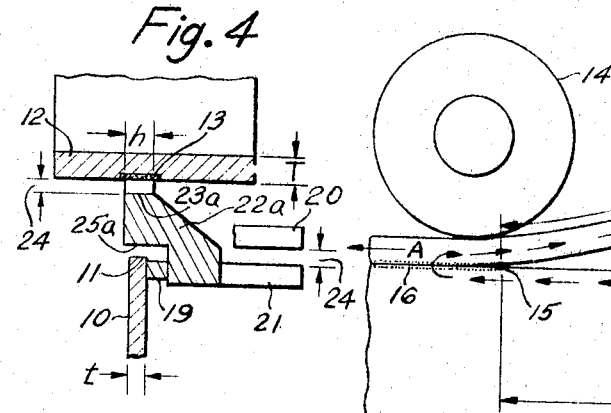
FIGS. 4 and 5 respectively are sectional views taken along lines 4—4 and 5—5 respectively of FIG. 3.
Figure 3:
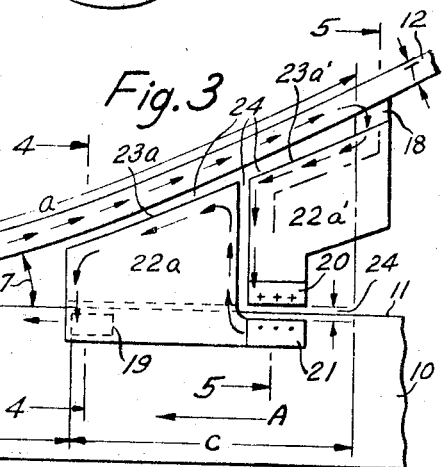
FIG. 3 is a schematic plan view showing one embodiment of the invention.
Figure 5:
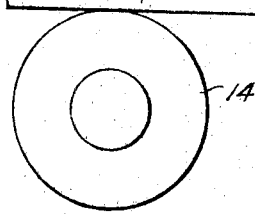
Figure 5:
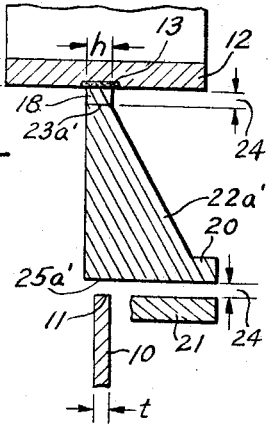

It will be understood that a gap conductor can take several forms. As shown in FIGS. 3-5 the gap conductor may comprise two members, 22a and 22a', each of which is connected to a separate contact. Conductor member 22a is connected adjacent its one end to contact 19 and adjacent its other end to contact holder 21 and extends into gap 17 between members 10 and 12 for a portion of the distance between weld point 15 and flange contact 18. Conductor member 22a' is connected adjacent its one end to flange contact 18 and adjacent its other end to contact holder 20 and extends into gap 17 for a portion of the distance between flange contact 18 and weld point 15. To insure a low inductance circuit in the vicinity of the contact holders 20 and 21 they are positioned close to one another, preferably with adjacent faces parallel and flat, as is well known to those skilled in the art. Conductor members 22a and 22a', have faces 23a and 23a', respectively, adjacent flange member 12, which have a height $h$ that is at least equal to the thickness $t$ of the web member 10. Faces 23a and 23a' are generally flat and are maintained substantially parallel to the face of flange member 12 and weld path 13 thereof. A space 24, is maintained between faces 23a and 23a', of conductor member 22 and 22a respectively and flange member 12, between conductor members 22a and 22a', and between contact holders 20 and 21. Space 24 is maintained as uniformly small as possible. Due to practical considerations of contact wear, deflections of the elongated moving web and flange members, and deflections of the contact holder, space 24 is preferably maintained between approximately 1/16" to 1/8". By means of the close spacing of the above elements and members a low inductance path is formed such that the electrical current follows the path shown by the arrows. Conductor members 22a and 22a' have faces 25a and 25a' respectively, on the opposite side of those members from faces 23a and 23a', which are spaced a sufficient distance from edge 11 of web member 10 to insure that there is no contact, with resultant arcing between these members.

Figure 6:
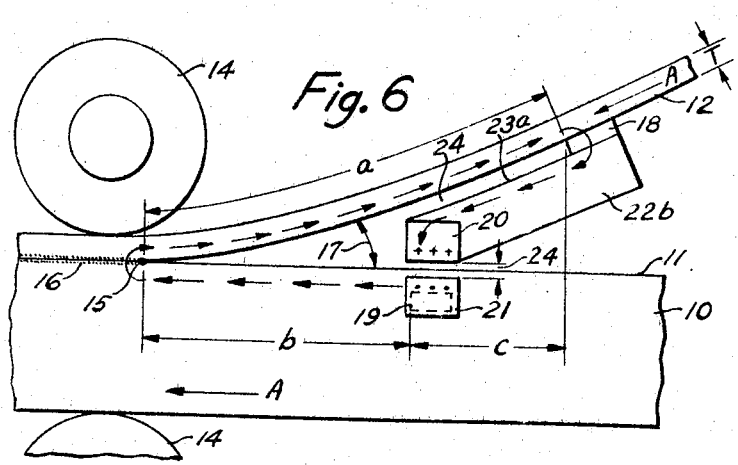

In the embodiment of the invention shown in FIG. 6 the gap conductor 22b comprises one piece which is connected to only one of the contact holders, flange contact holder 20. Gap conductor 22b is connected adjacent one end to flange contact 18 and adjacent the other end to flange contact holder 20 and extends through gap 17 between this holder and contact 18. In this embodiment the electrical current follows the path shown by the arrows.

With the somewhat different embodiment of the invention shown in FIG. 7 gap conductor 22c corresponds to gap conductor 22 of FIG. 2. Gap conductor 22c comprises one piece which is connected to only one of the contact holders, in this embodiment to web contact holder 21. Gap conductor 22c is connected adjacent one end to web contact 19 and adjacent the other end to web contact holder 21 and extends through gap 17 between this holder and contact 19. The arrows show the path followed by the electrical current in this embodiment.

The contacts and contact holders of high frequency welding apparatus are formed of copper or other good electrical conducting metal. Because of the high temperatures to which these pieces are exposed they are preferably provided with passages for the circulation of a cooling fluid. The use of the apparatus of this invention in a production line operation requires that the parts be ruggedly constructed to withstand the heat and vibration to which they are exposed. In FIG. 8 there is shown an actual embodiment of the invention shown schematically in FIG. 7. Contact 18 measures approximately 9/16" x 1" and contact 19 approximately 3/8" x 7/8"; gap conductor 22c is wedge shaped; it is approximately 1 5/8" long and tapered from about 5/16" at the back end to a narrower edge at the forward end. Contacts 18 and 19 respectively are silver soldered to contact holders 20 and 21, respectively, which are wrought copper. Openings 26 provide for the passage of cooling fluid into and out of holder 20, and threaded bolt holes 27 receive bolts by which the holder is secured to a flexible conductor, not shown.

The invention is particularly well adapted for use in the welding of structural sections from material ranging in gauge from 1/16" to 3/8" where the flange thickness T exceeds the web thickness $t$ and where the offset distance $c$ between the contacts is greater than 1".

I claim:

1. Apparatus for welding an edge of a first elongated workpiece to a face of a second elongated workpiece, said workpieces being continuously and uniformly moved to converge at a weld point located on a desired path of welding while being maintained in spaced relationship in advance of said weld point to form a narrow generally V-shaped gap terminating at said weld point, comprising:
   (a) a first contact engaging said first workpiece adjacent its edge in advance of the weld point,
   (b) a second contact engaging the face of said second workpiece on said desired path at a greater distance in advance of said weld point than said first contact,
   (c) leads connecting each of said contacts to a high frequency current source whereby to establish a circuit between said current source and said workpieces,
   (d) elongated electrically conductive means forming a part of the circuit between said current source and said workpieces, disposed in said gap between said workpieces and between said weld point and said second contact, secured to at least one of said contacts, and spaced from both of said workpieces.

2. The apparatus of claim 1 wherein said electrically conductive means comprises a single member secured to said first contact and extending toward said second contact.

3. The apparatus of claim 1 wherein said electrically conductive means comprises a single member secured to said second contact and extending toward said first contact.

4. The apparatus of claim 1 wherein said electrically conductive means comprises first and second spaced members, said first member secured to said first contact and extending toward said second contact and said second member secured to said second contact and extending toward said first contact.

5. The apparatus of claim 1 wherein said electrically conductive means has a flat face substantially parallel to the face of said second workpiece, said face having a height at least equal to the thickness of said first workpiece.

References Cited

UNITED STATES PATENTS

| | | | |
|---|---|---|---|
| 2,821,619 | 1/1958 | Rudd | 219—102 X |
| 2,857,503 | 10/1958 | Rudd et al. | 219—67 X |
| 3,015,018 | 12/1961 | Rudd | 219—67 |

ANTHONY BARTIS, Primary Examiner

L. A. SCHUTZMAN, Assistant Examiner

U.S. Cl. X.R.

219—67, 107